(12) United States Patent
Shuy

(10) Patent No.: US 10,511,187 B2
(45) Date of Patent: Dec. 17, 2019

(54) ENERGY UTILIZATION POINT TRACKER INVERTER

(71) Applicant: LT LIGHTING (TAIWAN) CORP., Xiangshan Dist., Hsinchu (TW)

(72) Inventor: Geoffrey Wen-Tai Shuy, Taipei (TW)

(73) Assignee: LT LIGHTING (TAIWAN) CORP., Hsinchu (TW)

( * ) Notice: Subject to any disclaimer, the term of this patent is extended or adjusted under 35 U.S.C. 154(b) by 0 days.

(21) Appl. No.: 16/197,139

(22) Filed: Nov. 20, 2018

(65) Prior Publication Data

US 2019/0089192 A1    Mar. 21, 2019

Related U.S. Application Data

(63) Continuation-in-part of application No. 15/838,044, filed on Dec. 11, 2017, now abandoned.

(51) Int. Cl.
| | |
|---|---|
| *H02M 7/53* | (2006.01) |
| *H02J 9/06* | (2006.01) |
| *G05F 1/67* | (2006.01) |
| *H02J 3/38* | (2006.01) |
| *H02M 3/156* | (2006.01) |
| *H02M 7/537* | (2006.01) |
| *H02M 1/00* | (2006.01) |

(52) U.S. Cl.
CPC .............. *H02J 9/062* (2013.01); *G05F 1/67* (2013.01); *H02J 3/385* (2013.01); *H02M 3/156* (2013.01); *H02M 7/537* (2013.01); *H02M 2001/007* (2013.01)

(58) Field of Classification Search
CPC ........ H02M 7/497; H02M 7/53; H02M 7/539; H02M 7/5395; H02M 1/081; H02M 1/084; H02M 2003/1586; H02J 3/382; H02J 3/385
See application file for complete search history.

(56) References Cited

U.S. PATENT DOCUMENTS

| | | | | |
|---|---|---|---|---|
| 7,479,774 B2 * | 1/2009 | Wai | ............... | H02J 3/383 323/222 |
| 9,712,081 B2 * | 7/2017 | Tanaka | ............... | H02M 7/493 |
| 2006/0082341 A1 | 4/2006 | Cocconi | | |

(Continued)

FOREIGN PATENT DOCUMENTS

WO        1993023912        11/1993

OTHER PUBLICATIONS

Enphase Energy, 2016 (1 page).

(Continued)

*Primary Examiner* — Gary L Laxton
(74) *Attorney, Agent, or Firm* — Workman Nydegger

(57) ABSTRACT

A sequential extraction control device for use in a 3-phase DC/AC converter. The 3-phase converter has three single-phase DC/AC converters, each controlled by a respective PWM extractor. Duty factor adjustments are made depending on a current portion of an AC power cycle. A sequential regulator causes the PWM extractors to have non-overlapping duty cycles such that extractions of each of the single-phase DC/AC converters is performed in sequence, rather than concurrently. This improves the efficiency in extracting power from the DC power.

13 Claims, 12 Drawing Sheets

(56) References Cited

U.S. PATENT DOCUMENTS

2011/0260547 A1   10/2011   Wang

OTHER PUBLICATIONS

Single Phase On-Grid PV Inverter, Ver. 1.0 (EN) Nov. 2017 (59 pages).
Delta, Grid-tie Transformerless Solar Inverter, www.deltaww.com, Version 07171221 (72 pages).
PCT/US2018/064495, Notification of Transmittal of the International Search Report and the Written Opinion of the International Searching Authority, or Declaration dated Feb. 12, 2019. (12 pages).

* cited by examiner

ENERGY UTILIZATION POINT TRACKER INVERTER

CROSS-REFERENCE TO RELATED APPLICATIONS

This patent application is a continuation-in-part of U.S. patent application Ser. No. 15/838,044, filed Dec. 11, 2017, which patent application is incorporated herein by reference in its entirety.

BACKGROUND

A single-phase DC AC converter converts Direct Current (DC) electrical energy from a DC energy source into Alternating Current (AC) power that conforms to the convention of the power grid. The power grid convention dictates that AC oscillating power carried on the power grid has a sinusoidal wave form with a particular fixed peak voltage and with a particular fixed frequency.

A conventional 3-phase DC/AC converter provides AC power to 3 power lines with 120° phase differences (referred to as the "A-phase, B-phase, and C-phase") between each power line. At its core, the 3-phase DC/AC converter consists of three single-phase DC AC converters, each performing extraction and comersion for delivery of the same time-averaged AC power to a respective power line. One of the single-phase DC/AC converters thus provides AC power on a first power line with the A-phase. A second of the single-phase DC AC converters thus provides AC power on a second power line with the B-phase. A third of the single-phase DC/AC converters thus provides AC power on a third power line with the C-phase In other words, each set of the three single-phase DC/AC converters extracts about the same amount of DC power; converts that extracted power into AC power with a 120° phase difference compared to the AC power provided by the other single-phase DC/AC converters; and sends the AC power into a power grid of 3 or 4 power lines. Consequently, each power line carries one single-phase AC power of the same frequency and the same amount of time-averaged power as the AC power of the other power lines; but with a 120° phase difference compared to the other power lines.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments described herein related to a sequential extraction control device for use in a 3-phase DC/AC converter. The 3-phase converter has a first single-phase DC/AC converter comprising a first PWM extractor to extract from DC power first AC power that has a first phase and that conforms to a power grid convention, a second single-phase DC/AC converter comprising a second PWM extractor to extract from the DC power second AC power that has a second phase and that conforms to the power grid convention, and a third single-phase DC/AC converter comprising a third PWM extractor to extract from the DC power third AC power that has a third phase and that conforms to the power grid convention. Duty factor adjustments are made depending on a current portion of an AC power cycle.

However, a sequential regulator causes the first PWM extractor to have a first duty cycle during which the first PWM extractor performs extraction, causes the second PWM extractor to have a second duty cycle during which the second PWM extractor performs extraction, and causes the third PWM extractor to have a third duty cycle during which the third PWM extractor performs extraction. Accordingly, unlike conventional 3-phase DC/AC converters, the sequential regulator causes the first, second and third duty cycles to not overlap, such that the first, second and third PWM extractors perform extraction sequentially, rather than simultaneously. This improves the efficiency in extracting power from the DC power. The sequential regulator further direct duty factor adjustments of the first, the second, and the third duty factors in accordance with a current time of at least one AC power cycle, to thereby adjust one or more of the first AC power, the second AC power, and the third AC power. Embodiments described herein are also directed towards a 3-phase DC/AC converter than contains such a sequential regulator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1A:
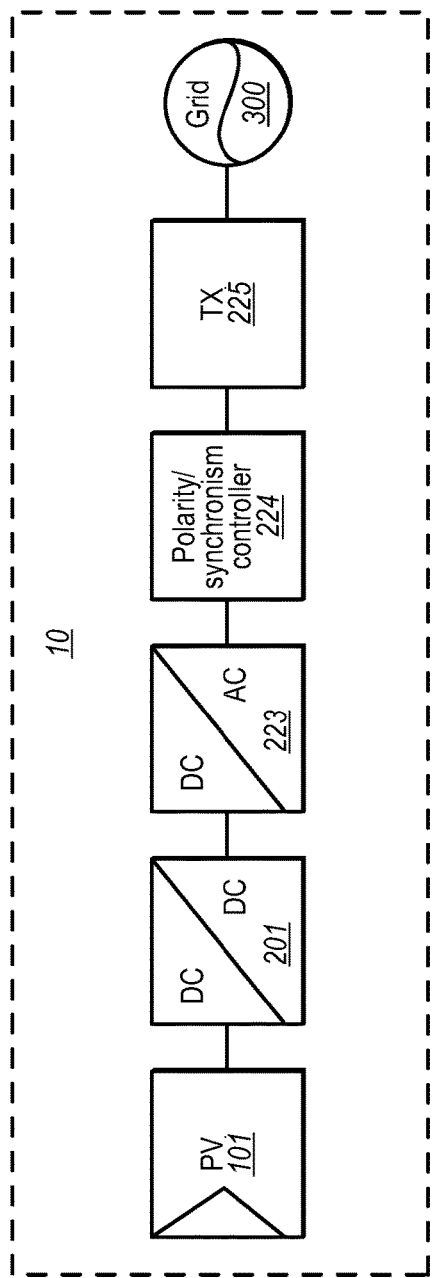
FIG. 1A depicts modules of a solar power generation sequence to illustrate and clarify the referenced terms energy extraction, preparation, conditioning, DC/AC conversion, and AC power delivery.

Fundamentally, a 3-phase DC/AC converter consists of 3 sets of single phase DC/AC converters performing functions of extraction and conversion, delivering similar time-averaged AC power to 3 pair's power lines; with 1200 phase differences. Therefore, to understand the 3-phase DC/AC converter is to have a good understanding in the single phase DC/AC converter; especially in the subject matter, the energy extraction. The terms power lines and power cable are interchangeable in the art and interchangeable herein, unless indicated otherwise.

Patent publications US2016/0036232 and US2017/0149250 A1 disclose a discovery that conventional single-phase converters can only extract and convert less than half of the Direct Current (DC) power input These patent publications teach that in order to efficiently extract produced DC electricity for energy utilization, the characteristics of the energy extraction device should be matched to effectively and efficiently extract the produced DC electric energy Furthermore, these patent publications teach that the related devices should also be matched to condition and/or deliver the extracted electricity for efficient energy utilization. In lieu of using the Maximum Power Point Tracking (MPPT) device as an optimizer for solar power stations, the reference publications proposed to use a "maximum energy utilization point tracker" as the optimizer for power stations; especially PV power plants. Such an optimizer will be referred to as the "MEUPT optimizer" herein.

In according to the reference patent publications, the MEUPT optimizer is designed to capture what they refer to as "surplus energy" or "surplus power", which they define as the electric energy (or power, respectively) that is produced but not extracted and/or delivered to the power grid for utilization. That definition of surplus energy (or surplus power) is also used herein. This surplus power has about a 90° phase difference from the power grid such that the surplus energy cannot be directly sold to the power grid. The MEUPT optimizer is also designed to temporarily store all the captured surplus energy within an energy reservoir; and then prepare and deliver this electric energy to the power grid for utilization. Thus, the electricity sales revenue of the PV power station can be enhanced when incorporating the MEUPT optimizer.

Several skills in the art can be employed in DC energy extraction, in energy preparation, in energy conditioning, and in energy delivery. The principles described herein may be used regardless of the DC energy source. Nevertheless, this disclosure uses a solar power generation string as an example of the DC energy source to illustrate and clarify the terms energy extraction, preparation, conditioning, and deliver, referred to herein. That said, the principles described herein are not limited to extraction, preparation, conditioning, and deliver) in the context of solar power. Although they have different physical meaning, the terms "energy" and "power" are interchangeable in the art and interchangeable herein unless indicated otherwise. Also, although they have different physical meaning, the terms "AC power train" and "AC voltage train" are interchangeable herein unless indicated otherwise.

Figure 1B:
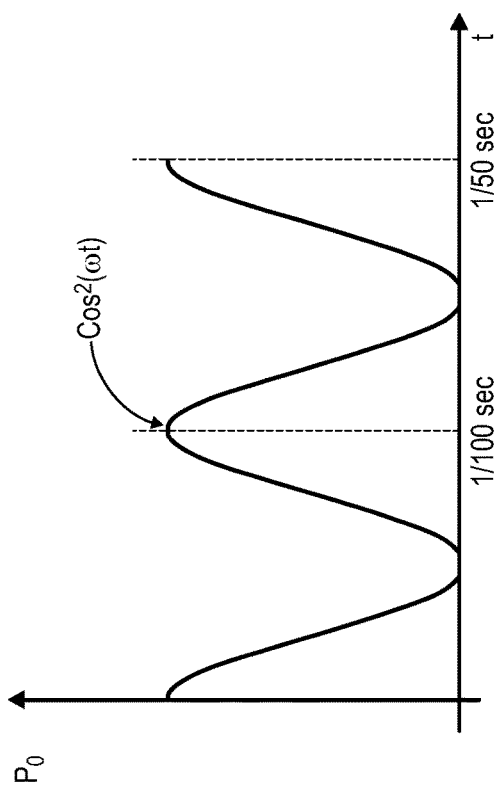
FIG. 1B symbolically shows a sinusoidal time varying (oscillating) AC voltage train representing an AC signal (a DC/AC converter output) that is sent through a specific power lines of a power grid system.

FIG. 1A shows the components of a solar power generation sequence 10. The sequence starts at the photo-electric energy conversion device (PV solar strings) 101, which generates electricity energy from photo energy (e.g., solar energy) as the primary energy source. This electrical energy has a time varying voltage that depends on cloud-cover, angle of the sun, efficiency of the PV cells, and many other factors. The electrical energy is then prepared and conditioned by a DC/DC boost converter 201 into a DC energy source with a fixed voltage. When adding a polarity switching controller 224, the DC/AC conversion module 223 converts the prepared fix voltage DC power into a sinusoidal time-varying (oscillating) AC voltage train depicted in FIG. 1B.

Figure 2A:
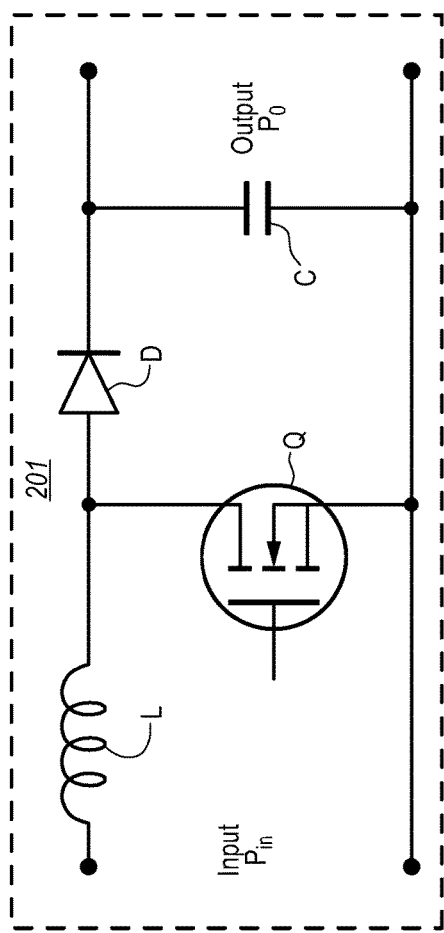
FIG. 2A shows a typical circuit of a Boost DC/DC converter, which is an example of the referenced single-phase energy extraction preparation (conditioning) device.
Figure 2B:
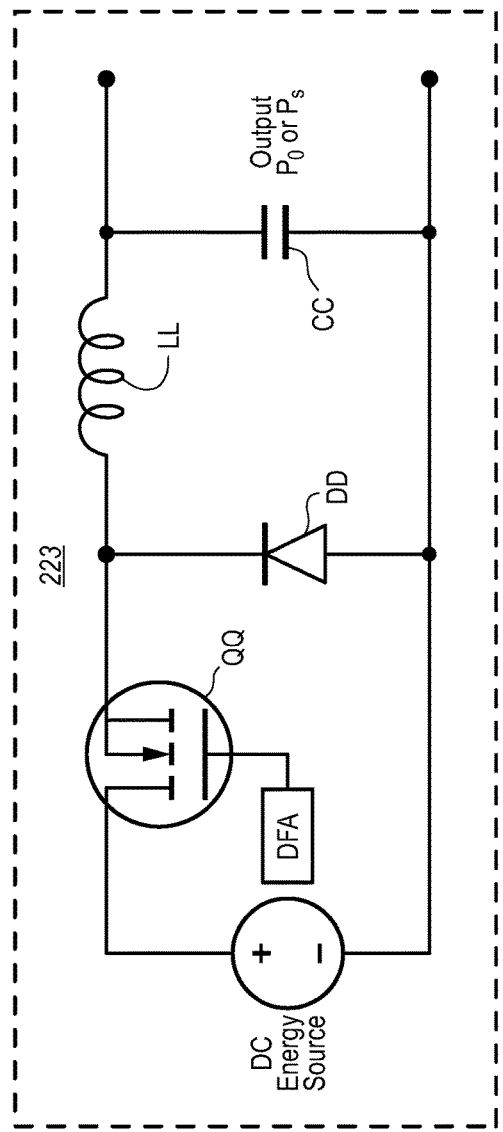
FIG. 2B shows a typical circuit of a Buck DC/DC convener, which is an example of live referenced single-phase energy extraction/conversion device.
Figure 2C:
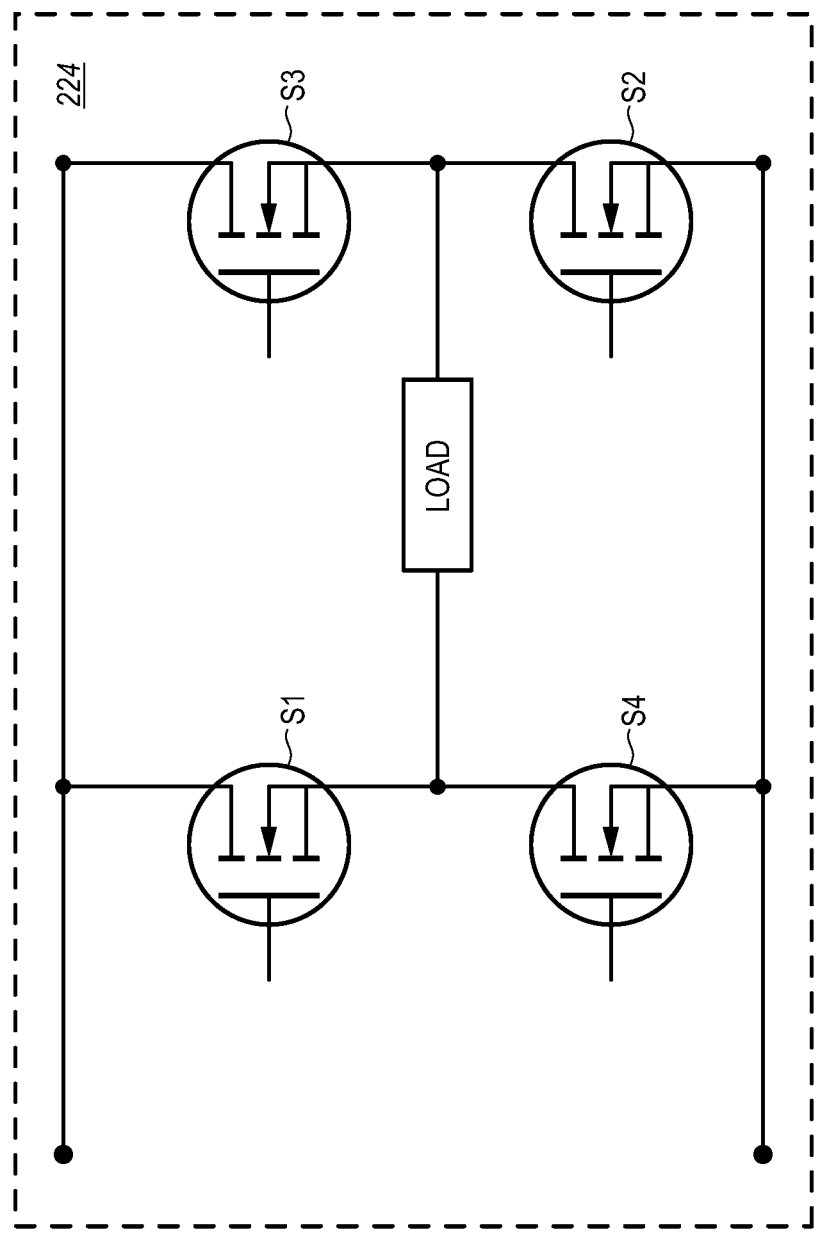
FIG. 2C shows a bridge structure of switches that controls the polarity of the DC/DC Buck converter output; thus producing the resulting AC voltage train output as depicted in FIG. 1B.
Figure 2D:
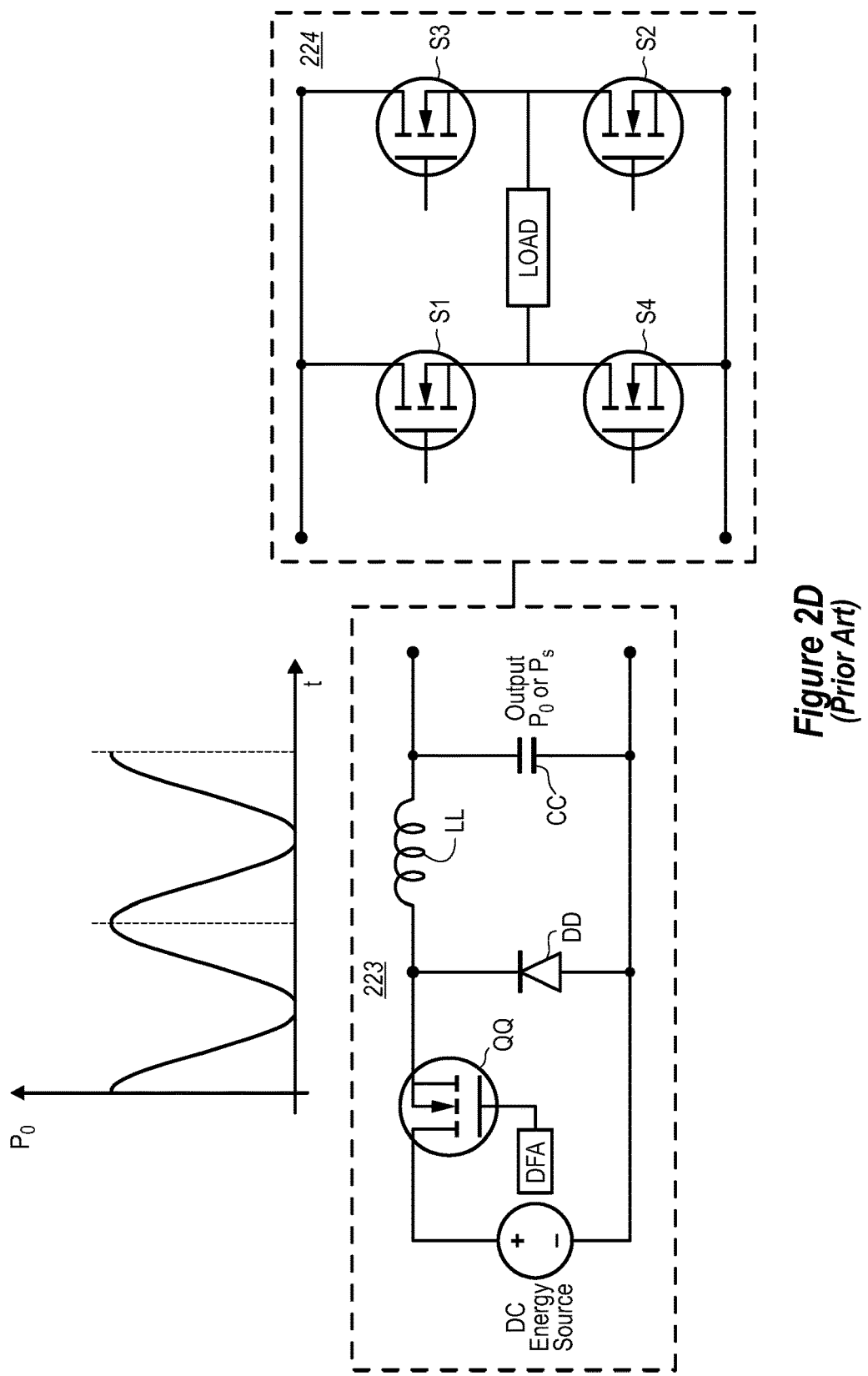
FIG. 2D symbolically depicts the pulsating sinusoidal AC power train of a DC/AC inverter power output that sent into a bridge of switches.

As an example, the DC; AC conversion module 223 may be a Buck module that is operated by a pulse width modulator (PWM). The Buck module so operated will also be referred to as a DC/AC converter. FIG. 2C illustrates an example of the bridge structure 224, which is referred as the Integrated Bridge Gate Transistor (the IBGT) in the art and also herein. As shown, the bridge structure 224 consists of a set of 4 switches (S1, S2, S3 and S4) that control the synchronism and polarity of the AC output voltage train of this DC/AC converter. Here, the "LOAD" represents the load looking into the transformer 225 from the bridge structure 224. The combination of devices 201 and 223 may be referred to as "the PWM extractor" herein.

The AC voltage power train produced by the bridge structure 224 conforms to the power grid convention. The AC power train is then fed through a transformer 225 to deliver the power into a grid 300 that is connected to the grid load. FIG. 2A shows an example of a typical circuit design of a Boost DC/DC converter 201 that can regulate the varying voltage DC energy source to a fixed voltage DC source. FIG. 2B shows an example of a typical PWM operated Buck module circuit design of a single-phase DC/AC inverter 223 to convert the fixed voltage DC source into a sinusoidal AC power tram The switch bridge structure 224 (shown in FIG. 2C) controls the polarity and synchronism of the output of this single-phase DC/AC converter 223. The single-phase DC/AC converter 223 (or the PWM extractor when combining the boost DC/DC converter 201 and the single-phase DC/AC converter 223) may also act as an energy extraction/conversion module in the conventional single-phase inversion module of the conventional 3-phase DC/AC converter that is comprised of 3 single-phase inverters.

Section One: Review on Conventional DC/AC Conversion

In general, the voltage at the maximum power production point (MPPPV) in a practical solar string is time-varying and less than the specified peak voltage of AC power grid. A voltage-boost energy extractor is needed in PV stations for energy extraction and preparation The voltage-boost energy extractor conditions the time-varying low voltage DC source into a fixed high voltage DC energy source.

FIG. 2A depicts a voltage booster circuit of a DC/DC Boost module 201 which consists of an inductor L; a controllable switch Q regulated by a feedback control duty factor adjuster FCDFA (not shown); a diode D; and a capacitor C. The switch Q is switched at a high frequency (typically about 18 kHz in commercial products) with an adjustable duty factor. Hie feedback control duty factor adjuster (FCDFA) regulates the adjustable duty factor such that this DC/DC Boost module 201 produces a substantially constant DC output voltage ($v_0$). In other words, this DC/DC Boost module 201 modifies a DC energy source with time varying voltage into an energy source having fixed DC voltage $v_0$ (typically, $v_0=v_{pk}$, where $v_{pk}$ is the peak voltage of the AC grid) that is suited to the subsequent device in the sequence (namely, the DC/AC conversion module 223 in the case of FIG. 1A). This subsequent DC/AC conversion module converts the DC power with a specified peak voltage into AC power in the form of a sinusoidal power train that conforms to the power grid convention.

During the period in which the switch Q is on, the designed inductor L extracts the energy from the input unit (in the case of FIG. 1A, the PV solar strings 101). Specifically, the inductor L is charged by the input power within the time period specified by a feedback-controlled duty factor of the PWM switch. This charging occurs urging the voltage $v_{sw}$ across switch Q upwards towards the input voltage $v_{in}$ until the voltage $v_{sw}$ across switch reaches a proper value. During the period in which the switch Q is off, current flows from the inductor L through the diode D to charge the designed capacitor C, thus producing a steady-state voltage equal to the desired output voltage (in the grid connecting case, $v=v_0=v_{pk}$) By using feedback control to adjust the duty factor of the on-off period of the switch Q of a properly designed fixed PWM frequency, one can boost up the output voltage from $v_{in}$ to the AC power grid specified peak voltage, $v_0=v_{pk}$. Thus, this voltage-boost circuit can produce a peak voltage suitable to output to the subsequent DC/AC conversion module. The above depicted circuit is termed the "Boost DC/DC converter" or "Boost converter" in the art.

As described above, the Boost converter is designed to modify a time varying voltage DC source (e.g. PV strings) to a DC source having a substantially constant voltage which can be equal to the peak voltage of the AC power grid. Note that to prevent the supply peak voltage from decaying in one AC cycle in normal operation, an adequate capacitance is designed for the capacitor C of the Boost circuit depicted in FIG. 2A. That is to say, this capacitor C is for maintaining the voltage to be substantially constant across one AC cycle. A capacitor that performs this described function is often termed as the "DC-link" capacitor in the art. The power grid convention tolerates very little voltage variation across a DC-link. Therefore, a DC-link capacitor is not designed to store large surplus energy as doing so would require an enormous (and thus expensive) capacitor in order to keep within the maximum tolerated voltage variation of the AC power grid.

FIG. 2B depicts a typical DC/AC conversion module 223, which consists of an inductor LL, a controllable switch QQ regulated by a duty factor adjuster DFA, a diode DD, and a DC-link capacitor CC. The switch QQ is switched at a high frequency (typically about 18 kHz in commercial products) with an adjustable duty factor. The switch QQ (which is often referred to as the "PWM switch") is regulated by a pulse width modulator (PWM) signal. The duty factor of this PWM switch is regulated by the duty factor adjuster DFA, so that the produced AC power train of this conversion module 223 conforms to the power grid convention. The depicted DC/AC conversion module 223 is termed the "Buck converter" in the art. The Buck converter 223 associated with the DFA can convert the DC energy source with specified peak voltage into a sinusoidal AC power train. This pulsating AC power train is sent through a switch bridge structure depicted in FIG. 2C (which is an example of the polarity/synchronism controller 224 of FIG. 1A); and then through the transformer (e.g., the transformer 225 of FIG. 1A) and into the grid (e.g., the grid 300 of FIG. 1A). As described, the switch bridge structure acts as a polarity and synchronism controller.

As depicted in FIG. 2C, when the sw itches S1 and S2 are both on, and the switches S3 and S4 are off, a positive voltage is applied across the load. Conversely, when the switches S3 and S4 are on, and the switches S1 and S2 are off, a negative voltage is applied across the load. When this switching is controlled by the synchronize regulator (not shown in FIG. 2C) that senses the positive negative voltage (or zero voltage crossing) transitions in the power grid, this bridge structure 224 (combined with the duty factor adjustor DFA) can effectively control the output polarity and synchronism of a single-phase DC AC converter.

The synchronous regulator can timely regulate the time-varying PWM duty factor adjustment; such that a pure sinusoidal power wave form is produced that is represented by $\cos^2(\omega t+\theta)$, with the required AC angular frequency $\omega$, with the required AC peak voltage $v_{pk}$, and with its phase $\theta$ synchronous with the corresponding power line of the grid. When incorporate with a fixed voltage DC input and with the parasitic inductance and parasitic capacitance in the grid, the inductor LL and the capacitor CC can be reduced or even omitted in practice. In the art, the terms "converter" and "inverter" (and for that matter, "conversion" and "inversion") are interchangeable and thus are interchangeable herein.

Figure 2E:
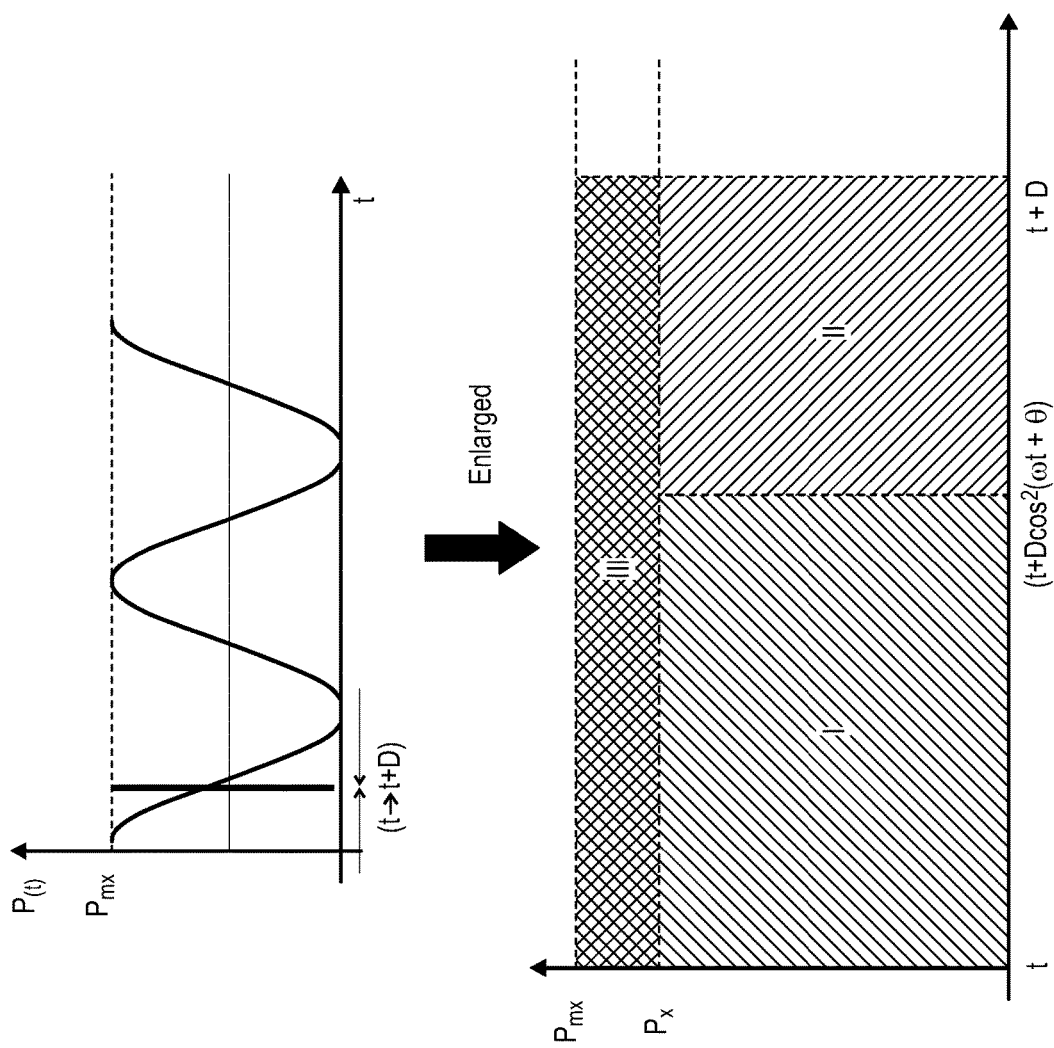
FIG. 2E symbolically depicts the DC energy pulse to be conditioned by the Buck converter in one PWM cycle; which is described as 3 regions: the region-I representing the energy extracted, and the region-II and the region-III representing the surplus energy region.

The duty factor adjuster DFA adjusts the duty factor as a function of time in accordance with the design to turn on/off the switch QQ of the Buck converter. Thus, with a properly designed circuit and the prepared peak voltage, this conversion module can produce the desired output voltage value, power form, frequency, and phase that comply with the design requirement including the requirement of the AC power grid convention, and the phase of the corresponding power line of the grid. In the case of a grid-connected unit, the AC synchronous regulator (typically built into the DC/AC converter) is employed to make the prepared AC power output drift along with the power grid in case the peak voltage of the power grid drifts and or in case the frequency of the power grid drifts. Such a produced AC power (not voltage) signal is depicted in FIG. 2E. In other words, using the PWM energy extractor described above, a single-phase DC/AC converter can extract and convert DC electric energy from a fixed voltage DC energy source into AC power that conforms to the power grid convention.

Very importantly, note that the output power. P(t) of above single-phase inverter varies in time with a form of $\cos^2(\omega t+\theta)$. Thus, over a specific time period, the energy delivered through the power line of the power grid is equal to the integration of its time varying output power train over this period. The resulting integral value is equal to only a half of the integration of the energy source's constant DC power over the same time period. In other words, the above-described conventional single-phase inverter can only extract and convert at most only half of the energy provided by the DC energy source. The left-over and unused energy is thus more than half of available input energy. This left-over amount contributes to most of the surplus energy described in the above referenced patent publications.

For the purposes of the following analysis, assume that the DC energy source is of constant power $P_{mx}$ in a period of several AC power cycles. FIG. 2E depicts the extracted DC energy pulse in one PWM cycle (having period D). As will be demonstrated, the extracted DC power $P_x$ is less than or equal to the DC power $P_{mx}$. The duty factor d(t)/D at this PWM cycle is adjusted to a value equal to $d(t)/D=\cos^2(\omega t+\theta)$ such that the produced power substantially equals $P_x*\cos^2(\omega t+\theta)$ that conforms to the power grid convention, and where θ is the phase of the corresponding power line of the grid. FIG. 2E (specifically, the lower half of FIG. 2E) also depicts the power-time space (called the energy space) with the time interval D as one PWM period; with the input DC power being $P_{mx}$; and with the extracted power being $P_x$.

As depicted in FIG. 2E, this energy space is divided into 3 regions Region-I represents the extracted DC energy pulse with extracted power $P_x$; and with a time duration of $D*\cos^2(\omega t+\theta)$, which is converted to the single-phase AC power of $P(t)=P_x*\cos^2(\omega t+\theta)$ at an arbitrary time t that corresponds to the PWM extraction time. Region-I is also referred to as the "energy extracted area" or "energy extracted region". The area in between the power $P_{mx}$ of the energy source and the power $P_x$ is the region-III. The region-II is the area after the energy extracted area in the PWM period D The combined area of the regions-II and -III represents a surplus energy area in this energy space. The energy in the surplus energy area (region) is not extracted, not converted into AC power, and is thus not conventionally utilized. Instead, this surplus energy is ultimately absorbed as heat.

To reiterate, the conventional DC/AC single-phase converter employs a voltage boost module to modify a DC power source with time varying voltage into a DC power source with a substantially constant and specific voltage, such as the peak voltage of the grid. This DC source serves as the input DC source for a PWM extractor to extract and convert the constant voltage DC input energy into a pulsating DC power signal. When the duty factor in one PWM cycle is regulated by $\cos^2(\omega t+\theta)$ at time t (where the phase θ is the phase of the corresponding power line of the power grid), the output power form conforms to the AC power convention. At a high level, the energy space of each PWM cycle consists of two regions—the extracted energy region (e.g., Region-I in FIG. 2E), and the surplus energy region (e.g., the combination of Region-II and Region-III in FIG. 2E). The extracted energy is thus converted to AC power and provided to the corresponding power line of the power grid; while the surplus energy is turned into heat unless captured and stored in a device such as the MEUPT optimizer.

As described above, the referenced patent publications teach that the amount of surplus energy is at least as large as the extracted energy when integrated through several AC period of time. In other words, a conventional single-phase DC/AC converter can only extract and convert at most half of the input DC energy. That is, when using the conventional single-phase DC/AC converter, at least half of the input DC energy will become surplus energy; which is not extracted, not converted, not delivered to the power grid, not utilized by the load; and will ultimately turn into heat.

The referred patent publications also stressed that the root cause of inefficient energy extraction of the single phase DC/AC converters persists into the conventional 3-phase DC/AC converters. This is because in essence, a 3-phase DC/AC converter consists of a set of 3 single phase DC/AC converters performing functions of extraction and conversion, delivering similar time-averaged AC power to 3 power line pairs; with 120° phase differences.

Section Two: Energy Extraction in Conventional 3-Phase Inverters

Figure 3A:
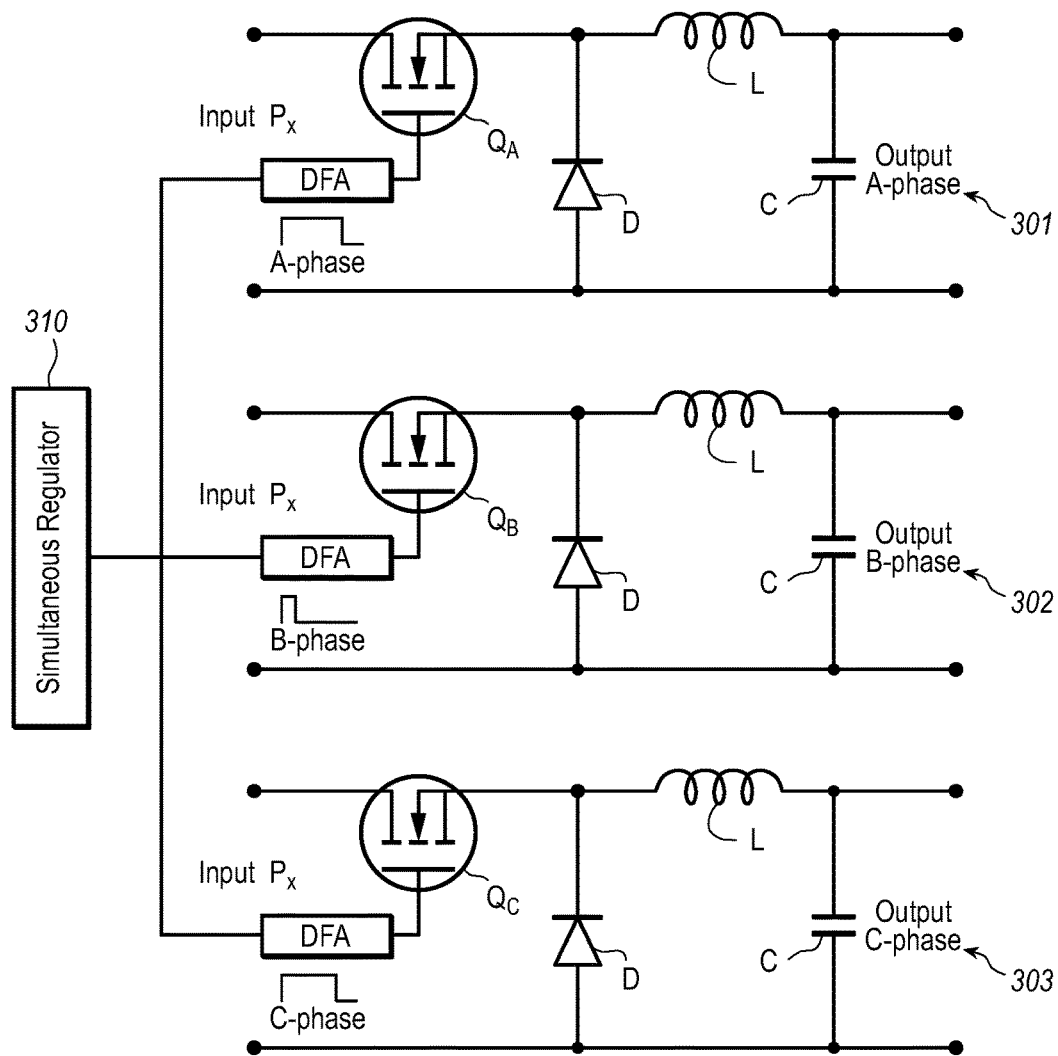
FIG. 3 A shows the circuits of the corresponding energy extractors for a conventional 3-phase DC/AC converter.
FIG. 3B symbolically depicts the DC input power in one PWM period.
FIG. 3C symbolically presents the energy concurrently extracted in one PWM cycle by the 3 energy extractors of FIG. 3.

There are three single-phase DC/AC converters built into a conventional 3-phase DC/AC converter. Each of the three single-phase DC/AC converters is equipped with one PWM energy extractor. The three energy extractors are regulated by a simultaneous regulator such that they operate in the same frequency (which is named the "PWM frequency"). FIG. 3 A depicts the three circuits 301, 302 and 303 of the corresponding PWM energy extractors. Each circuit 301, 302 and 303 is the same as the single-phase energy extractor and uses the same operating principles described above. The single-phase energy extractor 301 outputs A-phase AC power and has switch $Q_A$; the single-phase energy extractor 302 outputs B-phase AC power and has switch $Q_B$; and the single-phase energy extractor 303 outputs C-phase AC power and has switch $Q_C$. A simultaneous regulator 310 is employed to simultaneously turn on the 3 switches $Q_A$, $Q_B$, $Q_C$ in the 3 energy extractors to start the energy extraction at the same time, with the same frequency, but with different duty factors.

Figure 3B:
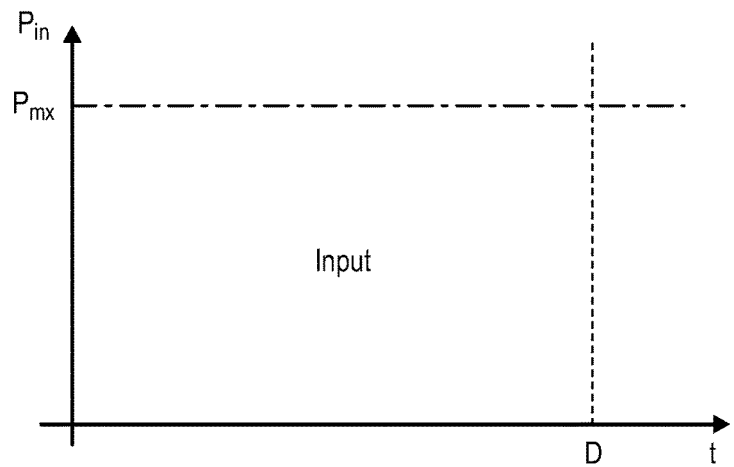
Figure 3C:
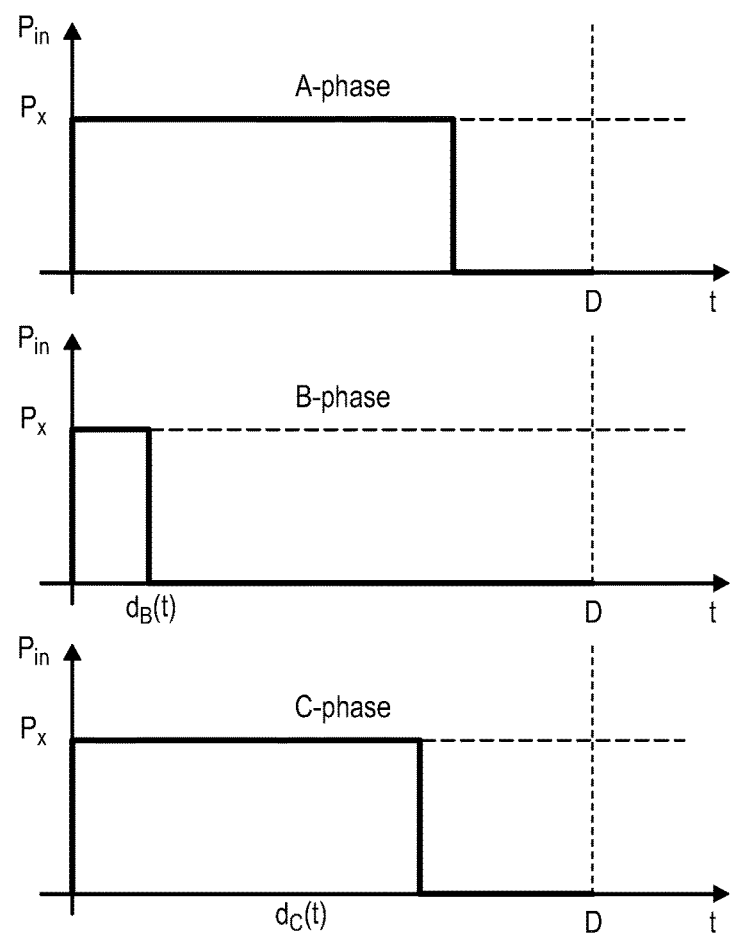

Assume the DC energy source has a DC constant input power $P_{mx}$ in one AC cycle. Also, assume it is true that one PWM period is a small fraction of the entire AC cycle. FIG. 3B depicts the DC input power in one PWM period. In one PWM cycle, the energy extracted by the 3 energy extractors is symbolically presented in FIG. 3C. The extracted power height is indicated as $P_x$ in FIG. 3C, which is lower than the 1/3 of the DC power input $P_{mx}$ in FIG. 3B. The duty factor at this PWM cycle for the A-phase energy extractor is adjusted to be equal to $\cos^2(\omega t)$ (or $\sin^2(\omega t)$) such that the power exacted is equal to $P_x*\cos^2(\omega t)$ (or $P_x* \sin^2(\omega t)$) that conforms to the single-phase AC convention. Similarly, the duty factor at this PWM cycle for the B-phase energy extractor is adjusted to be equal to $\cos^2(\omega t+120°)$ (or $\sin^2(\omega t+120°)$) such that the power exacted is equal to $P_x*\cos^2(\omega t+120°)$ (or $P_x*\sin^2(\omega t+120°)$). Also, the duty factor at this PWM cycle for the C-phase energy extractor is adjusted to be equal to $\cos^2(\omega t-120°)$ (or $\sin^2(\omega t-120°)$) such that the power exacted is equal to $P_x*\cos^2(\omega t-120°)$ (or $P_x* \sin^2(\omega t-120°)$). Also, the phase difference of the 3-phase AC outputs is kept to be 120° in conformity with the 3-phase power grid convention.

Notice that the energy extractions of a typical conventional 3-phase DC/AC converter (symbolically depicted in FIG. 3C) overlap in the time domain. The energy extraction which overlaps in the time domain is referred to as "simultaneous energy extraction" herein; and the regulator (shown in FIG. 3A) that directs the simultaneous energy extraction is referred to as the "simultaneous regulator" herein.

The law of energy conservation (combined with the fact that the characteristics of the electrical energy source may dynamically change) would force the sum of the heights of the three power extraction in a simultaneous energy extraction to be no greater than the input DC power source $P_{mx}$; or $P_{mx}>P_x+P_x+P_x$; or $P_x<(1/3) P_{mx}$. The sum total of the conventional 3-phase AC power output is $P(t)=P_x(\sin^2(\omega t)+\sin^2$ ($\omega t+120°$)+$\sin^2$($\omega t-120°$)); or P(t)=$P_x$($\cos^2$($\omega t$)+$\cos^2$($\omega t+$ 120°)+$\cos^2$($\omega t-120°$)). It can be shown that ($\sin^2$($\omega t$)+$\sin^2$ ($\omega t+120°$)+$\sin^2$($\omega t-120°$))=($\cos^2$($\omega t$)+$\cos^2$($\omega t+120°$)+$\cos^2$ ($\omega t-120°$))=3/2. Thus, P(t)=(3/2) $P_x$<(3/2)*(1/3)$P_{mx}$=1/2 $P_{mx}$. Or due to the practicing of simultaneous energy extraction, the sum total of the conventional DC/AC converter cannot be greater than (1/2) $P_{mx}$, a half of the DC input power.

In other words, the total AC power output of a conventional 3-phase DC/AC converter (employing simultaneous energy extraction) cannot be greater than a half of the DC input power. Or, a conventional 3-phase DC/AC converter can only extract and convert less than a half of the power produced in the Photo-Voltaic (PV) solar strings, when the converter is incorporated in PV power stations. And at least a half of PV produced DC power becomes surplus power which turns into heat at some point; unless that surplus power is captured and stored in a device such as the MEUPT device.

To reiterate, fundamentally a conventional 3-phase DC/AC converter operates three single-phase DC/AC converters to perform the extraction and conversion functions as a single-phase DC/AC converter, delivering similar time averaged AC power to 3 or 4 pair's power lines; with 120° phase differences. In other words, a conventional 3-phase DC/AC converter is a DC/AC converter that operates three single-phase DC/AC converters. Each single-phase DC/AC converter extracts half of its DC input power (which is equal to 1/3 of the input DC power); converts the amount of extracted DC power into AC power with 120° phase difference; and sends the three single-phase AC power outputs to a power grid of 3 or 4 power wires. Each power line carries one single-phase AC power with the same frequency (the AC power frequency), with the same amount of time-averaged power; but with 120° phase differences. The terms power wires and power cables are interchangeable in the art and herein.

In according with the derived result described in the referenced patent publications; and reconfirmed in the theoretical derivations above, each single-phase converter (in a 3-phase DC/AC converter) extracts and converts less than a half of the input DC power (which is less or equal to 1/3 of the DC power generated) in each single-phase AC power output. Therefore, the total maximum (extracted and converted) 3-phase AC power output from any conventional 3-phase DC/AC converter at any time can only be at most a half of the produced DC power; i.e., P(t)=3*(1/2)*(1/3)$P_{mx}$= (1/2)$P_{mx}$.

To emphasize, the above theoretical derivations reveal a severe consequence which is introduced by a common design practice of using simultaneous energy extraction in the conventional 3-phase DC/AC converter industry. This common design practice has been followed in the 3-phase DC/AC converter industry for a long time; without the industry even knowing of the existence of the severe consequence. This simultaneous energy extraction practice results in a severe consequence that is revealed in the above theoretical derivations for the very first time. This severe consequence is that the sum total of the 3 AC power outputs from a conventional 3-phase DC/AC converter is less than a half of the DC power input. This revealed common design practice is confirmed to have been a long time practice in green energy power industry; especially in the PV solar power industry.

To rephrase differently; the conventional PV solar power industry practices simultaneous energy extraction. In turn, the energy conservation law (combined with the fact that the characteristics of the electrical energy source may dynamically change) would force the sum total of the three extracted power heights $P_x$ to be less than a third of the PV generated DC power source $P_{mx}$ (i.e., $P_x$<(1/3) $P_{mx}$). It can then be shown that the sum total of the conventional 3-phase AC power outputs is P(t)=(3/2) $P_x$; which is (3/2)*(1/3) *$P_{mx}$<(1/2) $P_{mx}$, or smaller than a half of the PV produced DC power. Therefore, at least a half of the PV generated DC power becomes the surplus power when using a conventional 3-phase DC/AC converter. This amount of surplus energy turns into heat eventually; unless that surplus energy is captured and stored in a device such as the MEUPT optimizer.

As described above, at least half of the input DC power can become the surplus power when using a conventional 3-phase DC/AC converter. Given this information disclosed herein, a next question might be: "Can one just employ more than one additional conventional 3-phase DC/AC converters to extract, to convert the DC surplus energy to provide AC power"? The answer is negative for the reasons described hereinafter.

Figure 4:
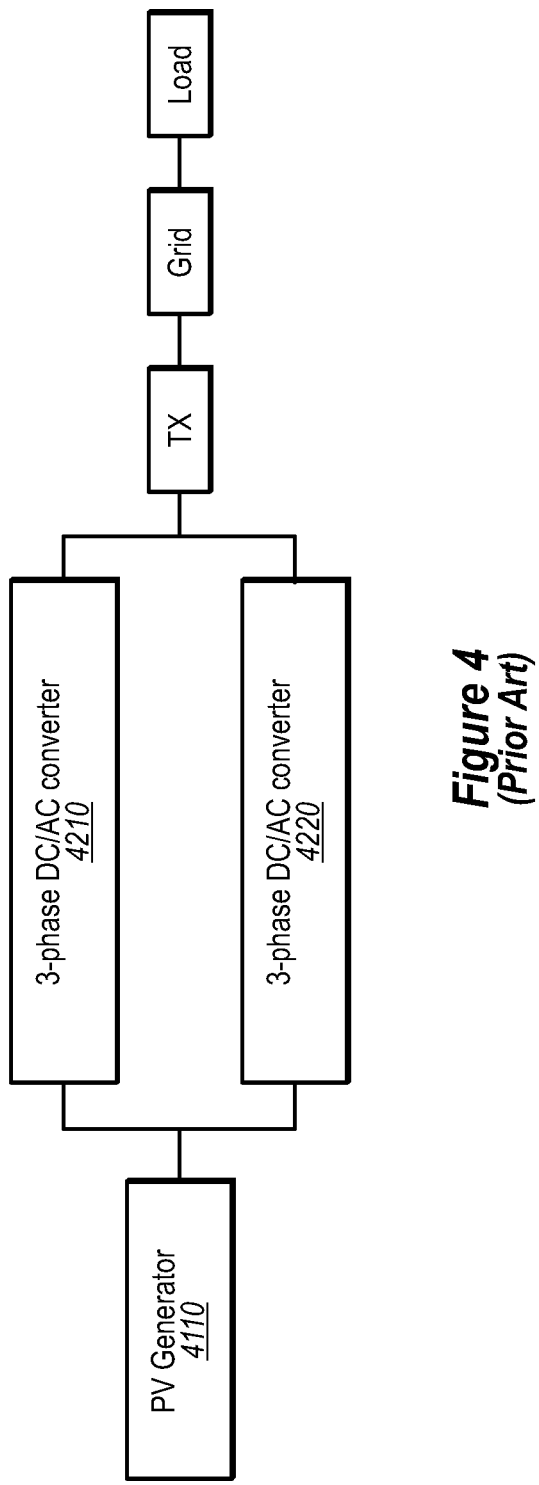
FIG. 4 symbolically depicts a configuration that a power source supplying $P_{mx}$ DC power that supports two identical 3-phase DC/AC converters with declared power rating of $P_{mx}$ but without an MEUPT device.

As depicted in FIG. 4, two identical sets of 3-phase DC/AC converters 4210 and 4220 (each with declared power rating $P_{mx}$) are connected to a PV generator 4110 supplying DC power source $P_{mx}$ without a device (such as an MEUPT optimizer) to capture and store the surplus energy. The law of energy conservation would only allow each of the two parallel-connected DC/AC converters 4210 and 4220 to draw half of the total input DC power with power strength $P_{mx}$ (i.e., drawing only 1/2 $P_{mx}$ for each converter as the power input). In other words, each of the two identical 3-phase DC/AC converters has an input DC power of 1/2 $P_{mx}$.

Recall that the 3 energy extractors (in a conventional 3-phase DC/AC converter) practice simultaneous energy extraction. As described above, each of the 3-phase DC/AC converters can only convert a half of the DC power input to produce AC power output; which is (1/2)*(1/2)*$P_{mx}$, or 1/4 of $P_{mx}$. The total AC power outputs of the two converters is 2*(1/4) of $P_{mx}$; which is still equal to (1/2) $P_{mx}$. Similar analysis can be performed to derive the same conclusion for the cases that either are equipped with a bigger power rating or are provided with more DC/AC inverters. To emphasize again, the simultaneous energy extraction is the root cause that results in more than a half of the produced DC power becoming surplus energy.

The next question might be: "can we perform an experiment to definitively prove that a half of solar produced power becomes surplus energy when extracted by a conventional 3-phase DC/AC converter?" The following section describes an experiment to prove that at least a half of solar produced power becomes surplus energy when extracted by a conventional 3-phase DC/AC converter.

Section Three: An Experimental Definitive Proof

An MEUPT optimizer is designed to capture/utilize this left-over electric energy—the surplus energy. Incorporating an MEUPT optimizer, the following describes the experimental set-ups and the step-by-step executions of an experiment which designed to definitively proof at least a half of solar produced power becomes surplus energy when extracted by a conventional 3-phase DC/AC converter.

Figure 6A:
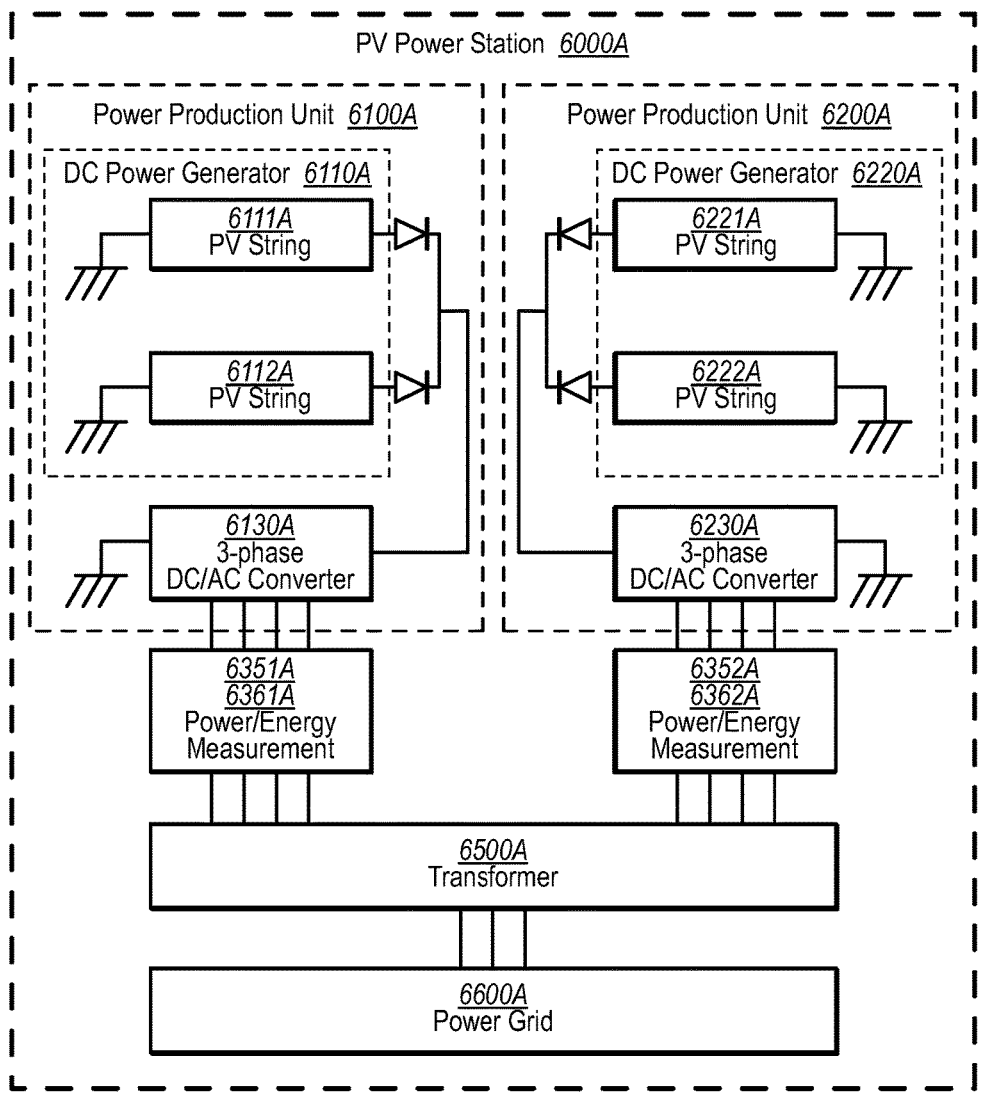
FIG. 6A illustrates a block diagram of a power station in an experiment, in which there are two AC power production units set up conventionally with power and energy meters to measure AC output of each unit.

FIG. 6A depicts the starting set up of a PV power station 6000A comprising 2 AC power production units 6100A and 6200A. Each of the AC power production units 6100A and 6200A practices blind MPPT conformation; and provides 3-phase AC power to a power grid 6600A. The AC power production unit 6100A consists of a DC power generator (30 kW) 6110A and a 3-phase DC/AC (30 kW) converter 6130A. The AC power production unit 6200A consists of a DC power generator (30 kW) 6220A and a 3-phase DC/AC (30 kW) converter 6230A. The power generator 6110A uses 2 parallel-connected PV strings 6111A and 6112A to generate DC electricity. The power generator 6220A uses another 2 parallel-connected solar strings 6221A and 6222A to generate DC electricity. Each of the 4 PV strings consists of 25 series-connected solar panels; each panel capable of producing 300 W of power at high noon and clear skies.

The DC power generator 6110A supplies DC power to the 3-phase DC/AC converter 6130A; and the DC power generator 6220A supplies DC power to the 3-phase DC/AC converter 6230A. These two converters 6130A and 6230A then convert the supplied DC power into 3-phase AC power. In the experiment, the AC output power of the power production units 6100A and 6200A were measured by two 3-phase AC watt-meters (in kW) 6351A and 6352A, respectively. The AC energy production (in kW*hour) of these two power production units 6100A and 6200A were also measured by two kW-hour-meters 6361A and 6362A, respectively. The produced 3-phase AC power was then provided to the grid 6600A via transformer 6500A. The PV power station was operated; and the energy production of the two AC power production units 6100A and 6200A w as measured for 7 days.

The readings of the two kW-hour-meters showed equal values every day during this time period. This provides high confidence that all elements of these two power production units 6100A and 6200A (including the two set of instruments for measurement) are substantially identical. After this step, one of the two AC power production units 6200A was kept unchanged, while the other AC power production units 6100A was modified with a different configuration 6100B as depicted in the left hand side of FIG. 6B.

Figure 6B:
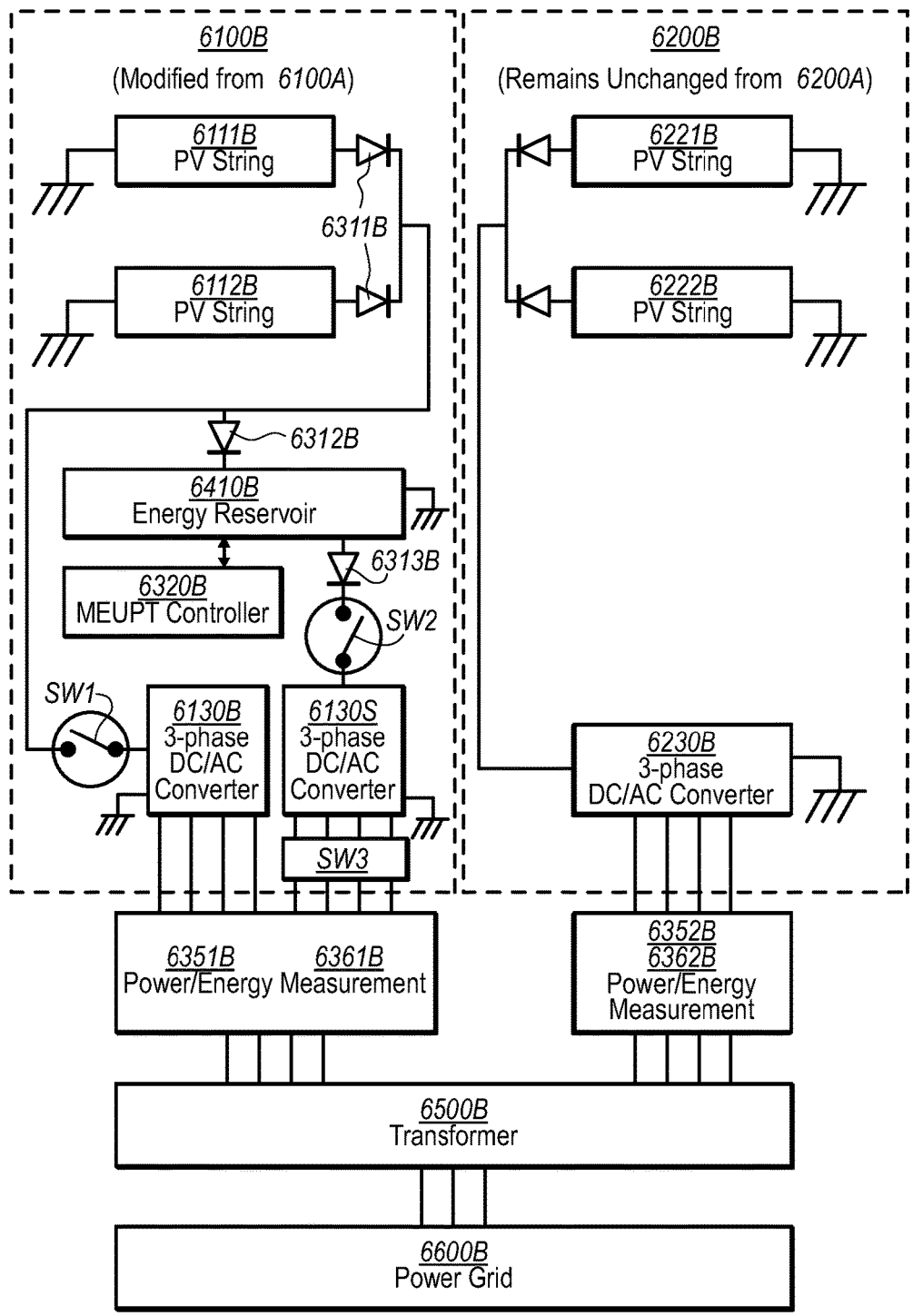
FIG. 6B illustrates a block diagram of the power station of FIG. 6A after modification to including decoupling devices and an energy reservoir, and that was used to verify improved energy output to the grid.

The power production unit 6200B of FIG. 6B is the power production unit 6200A of FIG. 6A unmodified. Also, the elements 6351B, 6361B, 6352B, 6362B, 6500B, 6600B of FIG. 6B are the same as the elements 6351A, 6361A, 6352A, 6362A, 6500A, 6600A, respectively, of FIG. 6A. Furthermore, although the configuration of the power production unit 6100B is different in FIG. 6B than the power production unit 6100A of FIG. 6A, some of the elements of the power production unit 6100B of FIG. 6B are the same as those that are included within the power production unit 6100A of FIG. 6A. For instance, the PV strings 6111B and 6112B of FIG. 6B are the same as the PV strings 6111A and 6112A, respectively, of FIG. 6A. Likewise, the DC/AC converter 6130B of FIG. 6B is the same as the DC/AC converter 6130A of FIG. 6A.

The following six (6) steps describe how the power production unit 6100A was modified into the configuration of 6100B, and is described with respect to the left hand side in FIG. 6B. Step 1 was to add a set of decoupling diodes 6311B in-between the solar strings 6111B and 6112B and the 3-phase DC/AC converter 6130B, which is practicing the blind MPPT conformation. Step 2 was to add an energy reservoir 6410B into the configuration. Step 3 was to connect the energy reservoir 6410B to the DC terminals of the DC/AC converter 6130B through another set of decoupling diodes 6312B and through a switch SW1. Step 4 was to add another 3-phase DC/AC converter 6130S (20 kW) into the configuration, which converter 6130S w as operated in according with the direction of a designed MEUPT controller 6420B. Step 5 was to connect the DC/AC converter 6130S to the energy reservoir 6410B through another set of decoupling diodes 6313B and through a switch SW2. Step 6 was to connect the output terminals of the converter 6130S to the power and energy measurement instrument set 6351B and 6361B through a switch SW3. Note that the referenced "decoupling diode set" may be those diodes that are termed "blocking diodes" in the art. Note also that sw itches SW1, SW2, and SW3 are added as depicted in FIG. 6B, such that the relevant devices can be introduced to (or removed from) the experiments at a proper time in the designed experimental execution steps described below.

The first night after the above modification was made; the SW1 was turned on while the switches SW2 and SW3 were turned off. The converters 6130B and 6230B started to run early the next morning. The power meters 6351B and 6352B measuring the two outputs of the power production units 6100B and 6200B showed the same reading. The reservoir 6410B also began charging up as indicated by measurement of the high terminal voltage of the reservoir 6410B. The system operated as described for the w hole day first day. The measured energy provided from the two power production units 6100B and 6200B were equal; as shown in the readings of the kW-hour-meters 6361B and 6362B. This experimental step demonstrated that the added decoupling diode sets 6311B and the reservoir 6410B did not change the power and energy productions of the power production unit 6100B.

The switches SW1, SW2, and SW3 were turned on the night after first day operation (the second night). The converters 6130B and 6230B started to run early in the early morning (the second day), while the converter 6130S started to run at lower power conversion level at about 15 minutes after the converters 6130B and 6230S started to run. Thereafter, the converter 6130S increased its conversion power level about every 2 minutes; that is consistent with the controller design and increment of the reservoir energy level. The reading of the power meter 6351B (for unit 6100B) reached about double of reading of the power meter 6352B (for unit 6200B) for the entire day—until nearly sunset. The energy provided from the two power production units 6100B and 6200B by the end of the second day were derived from the two kW-hour-meters' readings. The result showed that the energy provided from the modified power production unit 6100B was more than double the energy provided from the unmodified power production unit 6200B. For the following six consecutive days, the switches SW1, SW2 and SW3 remained on, and the energy provided from the modified power production unit 6100B was consistently more than double that of the power production unit 6200B each day.

The next night, the switches SW2 and SW3 were turned off. The measured energy provided from the power production units 6100B and 6200B returned to the same level for the followed 5 consecutive days during with switches SW2 and SW3 remained off. The next night, switches SW2 and SW3 were turned on again. The measured energy production of the power production unit 6100B became again more than double that of the power production unit 6200B every day for the following 5 consecutive days with switches SW2 and SW3 remaining on.

As described above, the step-by-step execution of this experiment definitively proves the existence of the surplus energy in a PV power station as predicted in the Section Two. Specifically, in a PV power station when the produced DC energy is extracted by a 3-phase DC/AC converter, about half of the PV produced energy still exists as left-over surplus energy.

There are two ways to mitigate the undesirable consequence described above. The first way is to follow the principles described in the referenced patent publications to incorporate the MEUPT optimizer into the energy system. The other way is to follow the principles described herein; which proposes to practice a sequential energy extraction associated with the proposed duty factor adjustments for the A-phase, the B-phase, and the C-phase.

Section Four: The Proposed Sequential Energy Extraction

The principles described herein propose to practice a sequential energy extraction for the A-phase, the B-phase, and the C-phase; that can prevent the occurrence of time-overlapping energy extraction. When practicing the sequential energy extraction in each and every PWM period, the A-phase timely extracts the DC energy first; the B-phase then timely extracts the DC energy right after the A-phase extraction; and lastly the C-phase timely extracts the remaining DC energy. By so doing, the height of energy extraction, $P_x$ in each phase can reach its maximum value; which is equal to the $P_{mx}$. This consequence is different from the practice of simultaneous energy extraction; in which the height of the energy extraction can only equal to one third (⅓) of the $P_{mx}$.

Figure 5A:
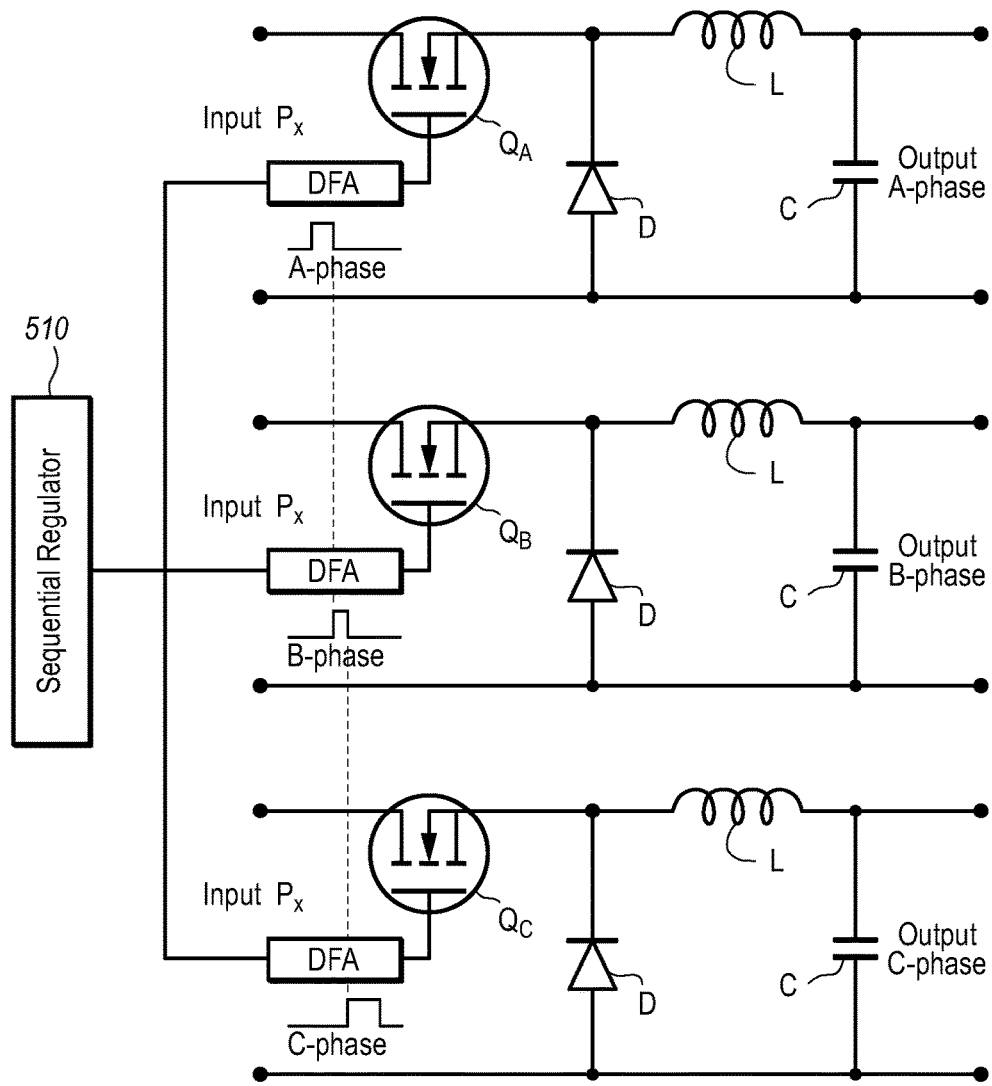
FIG. 5A shows the 3 circuits for the A-phase energy extraction, the B-phase energy extraction, and the C-phase energy extraction of an MEUPT inverter.

To make the following analysis intuitive and without losing generality, let us assume that the AC frequency is 50 hertz, and the PWM frequency is 18 K hertz. This assumption makes the AC power phase-angle advance exactly 1° in the time duration of every PWM period. FIG. 5A depicts the proposed circuits for this new energy extractor. The circuits of energy extraction are similar to that of conventional one depicted in FIG. 3 A. Note that the simultaneous regulator 310 of the conventional energy extractor depicted in FIG. 3A is now replaced by a sequential regulator 510 as depicted in FIG. 5 A.

To emphasize, an energy extractor regulated by a simultaneous regulator is a simultaneous energy extractor; and energy extraction performed by a simultaneous energy extractor is the definitive practice of simultaneous energy extraction. On the other hand, an energy extractor regulated by a sequential regulator is a sequential energy extractor; and energy extraction performed by a sequential energy extractor is a practice of the proposed sequential energy extraction.

Figure 5B:
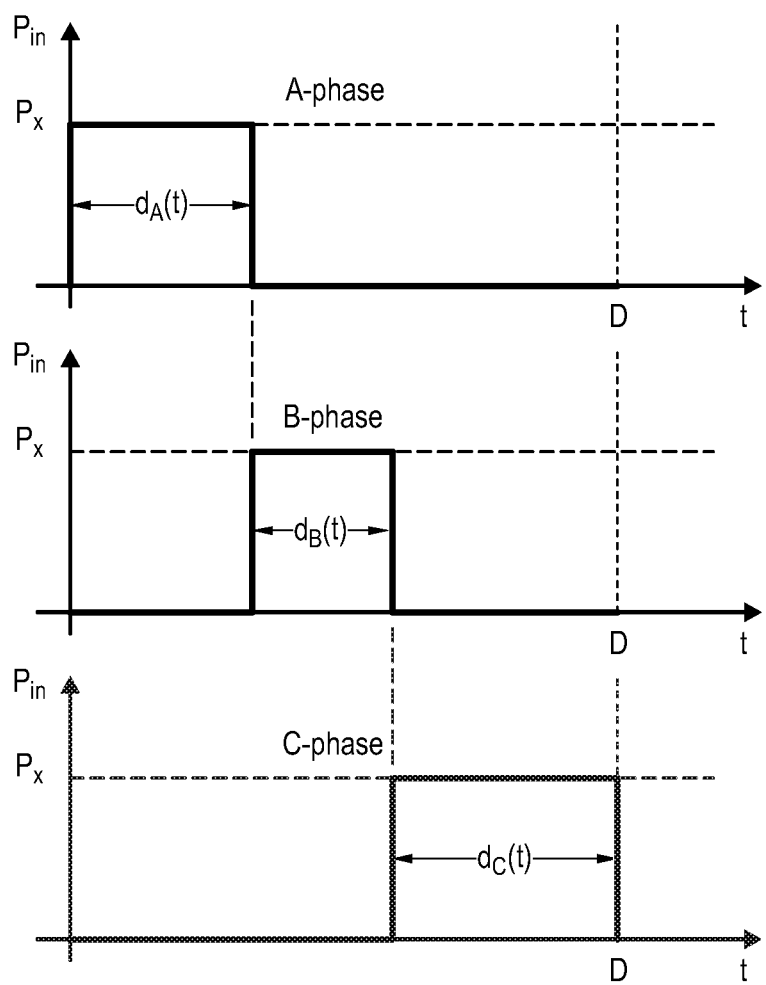
FIG. 5B symbolically depicts the time sequence in energy extractions of the A-phase, the B-phase, and the C-phase regulated by a sequential regulator of FIG. 5A.

As an embodiment; FIG. 5B depicts a 3-phase DC/AC converter employing a sequential regulator to regulate the 3 phase energy extractions. In this energy extraction practice, the A-phase energy extraction is arranged to start at the beginning of a PWM cycle with a time duration of $d_A(t)$; the B-phase energy extraction is arranged to start at the finishing of A-phase extraction with time duration of $d_B(t)$; and the C-phase energy extraction is arranged to follow the finish of the B-phase energy extraction with time duration of $d_C(t)$. These 3 energy extractions are arranged to perform sequentially and seamlessly. It can be seen that no time domain overlapping energy extraction occurs, as depicted in FIG. 5B. In reality, there might be some time passage between the end of one energy extraction, and the beginning of another energy extraction. How ever, this time passage within each PWM cycle may be kept quite small, and preferably below 33%, 20%, 10%, or even 1% of the PWM cycle. Therefore, the height of power extraction $P_x$ in each phase can be designed to equal to its maximum value, the input DC power $P_{mx}$; in contrast to a fraction (⅓) of the input power that is used in simultaneous energy extraction.

Let us set the time duration of one PWM period as D. The duty factor for A-phase extraction is defined as $d_A(t)/D$; the duty factor for B-phase extraction is $d_B(t)/D$; and the duty factor for C-phase extraction is then equal to $d_C(t)/D$. Furthermore, the principles described herein propose to assign values of these three duty factors as: $d_A(t)/D=2/3 \cos^2(\omega t)$, $d_B(t)/D=2/3 \cos^2(\omega t+120°)$, and $d_C(t)/D=2/3 \cos^2(\omega t-120°)$. The corresponding time interval for the 3 energy extractions can then be assigned in accordance with the respective values of the duty factors. Note that the total time durations of these three energy extraction; $d_A(t)+d_B(t)+d_C(t)$ is exactly equal to D, the time interval of one PWM period.

As mentioned above, one PWM period time interval is equal to that of a 1° phase-advancement in AC power cycle; thus the 3 phase differences would be at an 120° interval plus or minus 1°; which is well within tolerance of existing power grid. The sum total of the power carried in the three pairs of power lines is then equal to $P(t)=P_A(t)+P_B(t)+P_C(t)=P_{mx} (2/3) (\cos^2(\omega t)+\cos^2(\omega t+120°)+\cos^2(\omega t-120°))=P_{mx} (2/3) (3/2)=P_{mx}$. In other words, the total power carried in the 3-phase power lines at any time is substantially equal to the amount of the produced DC power. In other words, when practicing the sequential energy extraction, there is no (or insubstantial) left-over surplus energy. Stated another way, when incorporating the sequential energy extractor, a 3-phase DC/AC converter can extract all or substantially all of the produced DC power with zero or substantially zero surplus energy.

To reiterate, the principles described herein propose to start each energy extraction of the 3 phase sequentially and seamlessly. When the 3 phase energy extractions become sequential events, the extraction power height can be set to equal to the DC input power $P_{mx}$. The principles described herein further propose to have the 3 duty factors equal to 2/3 $\cos^2(\omega t)$ for A-phase, 2/3 $\cos^2(\omega t+120°)$ for B-phase, and 2/3 $\cos^2(\omega t-120°)$ for C-phase. By so doing, these 3-phase energy extraction events can take place sequentially; and the 3 events of the energy extractions can seamlessly finish exactly in one PWM period; and all the AC power phase differences between A-phase, B-phase, and C-phase 120° within an acceptable tolerance of 1°.

Therefore, when a 3-phase DC/AC converter incorporates the proposed sequential energy extractor; the DC/AC converter is then designed can extract and convert the entire solar produced power, $P_{mw}$ with no left-over surplus energy; and the produced AC power output can conform to the 3-phase AC power grid convention.

Section Five: Design Considerations of the Sequential Regulator

In one embodiment, one can apply the starting of PWM to start the A-phase extraction with a duration time of $(2/3)D*\cos(\omega t)$; then apply the signal-change of the A-phase extraction (from on-period to the off-period) to trigger the start the B-phase extraction with a duration time of $(2/3) D*\cos(\omega t+120°)$; and then apply the signal-change of the B-phase extraction (from on-period to the off-period) to trigger the start the C-phase extraction.

In another embodiment, since one PWM period makes a definitive AC phase-advancement (say, 1°), one can construct a table with a definitive finish time of A-phase extraction as the first value, and that of the B-phase extraction as the second value. This table can contain the number of columns to spend the whole power cycle (say, 180 columns for 180°). Note that a voltage cycle of 360 20 produces a power cycle every 180° since power is proportional to the square of the voltage, and squaring a sinusoidal voltage wave creates a power wave with double the frequency.

Using the two sequential time lines in each column of this time table, a design can periodically designate the two time lines within one PWM time period as the starting time (the beginning of PWM) and the ending time (the first time value in the column) of A-phase energy extraction; for the starting time (the first time value in the column) and the ending time (the second lime value in the column) of B-phase energy extraction; and for the starting time (the second time value in the column) and the ending time (the end of PWM) of C-phase energy extraction. Finishing the 180 columns means finishing the DC/AC conversion for one AC power cycle. The process can then be repeated for the next round of DC/AC inversion, and so on. A clock with better than 1/180,000 second (or 5 microseconds) time resolutions shall be used in this embodiment.

The synchronization module in the conventional 3-phase DC/AC converter can be employed to synchronize the starting of the PWM at the maximum and minimum of the AC power cycles; such that the phase of the produced AC power can drift along with the phase/frequency drifting occur in power grid occasionally. The principles described herein also may employ a device to accommodate the phase frequency drift.

Section Six: Summaries

As described in Section One, a conventional AC single-phase converter employs a PWM extractor to extract the DC input power. When the duty factor in one PWM cycle is regulated by $\cos^2(\omega t)$ (or $\sin^2(\omega t)$) at time t, the AC power output conforms to the power grid convention. Note that there are two regions in energy space of each PWM cycle; one is the extracted energy region while the other is the surplus energy region. The reference patent publications teach that the amount of surplus energy is at least as large as the extracted energy when integrated through several AC period of time. In other words, a single phase DC/AC converter can only extract and convert at most a half of the input DC power. The extracted energy is converted to AC power and provided to the power grid; while the surplus energy is turned into heat unless captured and stored in a device such as the MEUPT device.

As described in Section Two, a conventional 3-phase DC/AC converter operates of three identical single-phase DC/AC converters. Each single-phase DC/AC converter extracts and converts a half of its DC input power into AC power. Note that due to the practice of simultaneous energy extraction, this DC input power can only be equal to one third of the DC power generated at maximum. Therefore, a 3-phase DC/AC converter converts and extracts at most a half of the produced DC power. The AC power outputs of these three single phase converters have 120° phase difference to each other. Also, these 3 single-phase AC power outputs are sent to a power grid through 3 or 4 power wires.

To rephrase differently; the conventional PV solar power industry uses the conventional DC/AC converter, which practices simultaneous energy extraction; such that the energy conservation law forces the sum total of the three extracted power heights $P_x$ to be less than a third of the PV generated DC power source $P_{mx}$ (i.e., $P_x<(1/3)P_{mx}$). It can then be shown that the sum total of the conventional 3-phase AC power outputs is $P(t)=(3/2)P_x$ at best; which is smaller than $(1/2)P_{mx}$, or a half of the PV produced DC power. Therefore, at least a half of the PV generated DC power becomes the surplus power when using conventional 3-phase DC/AC converters. This amount of surplus energy will turn into heat eventually unless it is captured and stored in a device such as the MEUPT optimizer.

The theoretical derivations described in Section Two reveal a severe consequence which is introduced by a common design practice in the conventional 3-phase DC/AC converter industry. This common design practice has been practiced in the 3-phase DC/AC converter industry for a long time; without the industry even knowing the existence of the severe consequence. This common practice is that the conventional 3-phase DC/AC practice simultaneous energy extraction. This practice can definitely result in a severe consequence as revealed for the first time to the industry in the above theoretical derivations. This severe consequence is that the sum total of the 3 AC power outputs from a conventional 3-phase DC/AC converter is less than a half of the DC power input. This revealed common practice is confirmed to have been a long time practice in green energy power industry; especially in the PV solar power industry.

Two ways to mitigate the above described undesirable consequence are 1) to follow the principles described in the reference patent publications to incorporate the MEUPT optimizer into the energy system, or 2) to follow the principles described herein which proposes to practice the sequential energy extraction associated with the proposed duty factor adjustments for the A-phase, the B-phase, and the C-phase.

Section Four describes the proposed sequential energy extraction with the proposed duty factor adjustments. When practicing the described sequential energy extraction in each and every PWM period, the A-phase timely extracts the due DC energy first; the B-phase timely extracts the due DC energy right after the A-phase extraction; and the C-phase timely extracts the due DC energy at the last. By so doing, the height of energy extraction, $P_x$ in each phase can reach its maximum value which is equal to the produced power, $P_{mx}$. This is different from the consequence resulting from practicing conventional simultaneous energy extraction; which causes the height of energy extraction, $P_x$ in each phase to only reach 1/3 of the $P_{mx}$ at best.

The principles described herein propose that the energy extraction starting time for each phase is regulated by a sequential regulator. The 3 phase energy extractions become sequential events; such that the extraction power height can equal to the DC input power $P_{mx}$. The principles described herein further proposes the 3 duty factors to be $2/3 \cos^2(\omega t)$ for the A-phase, $2/3 \cos^2(\omega t+120°)$ for the B-phase, and $2/3 \cos^2(\omega t-120°)$ for the C-phase. These 3-phase energy extraction events can then sequentially take place seamlessly; and the 3 energy extraction events can also finish exactly in one PWM period. Furthermore, the AC power phase differences between A-phase, B-phase, and C-phase can be designed to be 120° plus or minus 1°. Therefore, when a 3-phase DC/AC converter incorporating the proposed sequential energy extractor; the new designed DC/AC converter can extract and convert the entire (or substantially all) of the produced power, $P_{mx}$ with no (or little) left-over surplus energy. Furthermore, the produced AC power outputs can easily conform to the 3-phase AC power grid convention.

The present invention may be embodied in other specific forms without departing from its spirit or essential characteristics. The described embodiments are to be considered in all respects only as illustrative and not restrictive. The scope of the invention is, therefore, indicated by appended claims rather than by the forgoing description. All changes which come within the meaning and range of equivalency of the claims are to be embraced within their scope.

What is claimed is:

1. A sequential energy extraction control device configured to control a DC energy extraction sequence and an energy extraction duration time of three single-phase DC/AC converters which are built in a 3-phase DC/AC converter, the 3-phase DC/AC converter comprising:

a first single-phase converter in the 3-phase DC/AC converter comprising a first PWM extractor configured to operate at above 1 kHz high/low signal switching and that is configured to extract from a DC power source a first AC power, the first AC power having a frequency and a first phase that conforms to a power grid convention of AC power that exists in a first power delivering cable pair of a 3-phase AC power grid;

a second single-phase converter in the 3-phase DC/AC converter comprising a second PWM extractor configured to operate at above 1 kHz high/low signal switching and that is configured to extract from the DC power source a second AC power, the second AC power having a same frequency as the frequency of the first AC power, but having a second phase that conforms to the power grid convention of AC power that exists in a second power delivering cable pair of the 3-phase AC power grid; and a third single-phase converter in the 3-phase DC/AC converter comprising a third PWM extractor configured to operate at above 1 kHz high/low signal switching and that is configured to extract from the DC power source a third AC power, the third AC power having a same frequency as the frequency of the first AC power and the frequency of the second AC power, but having a third phase that conforms to the power grid convention of AC power that exists in a third power delivering cable pair of the 3-phase AC power grid; the sequential energy extraction control device comprising:

a sequential regulator configured to cause the first PWM extractor to have a first duty cycle during which the first PWM extractor performs power extraction from the DC power source, causes the second PWM extractor to have a second duty cycle during which the second PWM extractor performs power extraction from the DC power source, and causes the third PWM extractor to have a third duty cycle during which the third PWM extractor performs power extraction from the DC power source; such that the first, second and third duty cycles do not overlap in a time domain, and such that the first, second and third PWM extractors perform extraction sequentially;

the sequential regulator further configured to direct duty factor adjustments of the first, the second, and the third duty cycles in accordance with a current time of at least one AC power cycle, to thereby adjust one or more of the first AC power, the second AC power, and the third AC power, the duty factor adjustments being arranged such that the first duty cycle is $2/3 \cos^2(\omega t)$, the second duty cycle is $2/3 \cos^2(\omega t+120°)$, and the third duty cycle is $2/3 \cos^2(\omega t-120°)$ as function of time t in the AC power cycle.

2. The sequential energy extraction control device of claim 1, the sequential regulator comprising:
a time clock;
a time table with a plurality of columns, each column corresponding to a respective portion of an AC power cycle, and representing sufficient information to determine the first, the second, and the third duty cycles for the respective portion of the AC power cycle; and
an activator configured to use the sufficient information to sequentially activate the first, the second, and the third PWM extractors.

3. The sequential energy extraction control device of claim 2, the sufficient information being a start time and an end time for the first duty cycle.

4. The sequential energy extraction control device of claim 2, the time table containing at least two value in each of the plurality of columns; the first value being equal to $D*(2/3)*\cos^2(\omega t)$ and the second value is equal to $D*(2/3)*\cos^2(\omega t+120°)$, where D is the PWM period and t is the time within the AC power cycle.

5. The sequential energy extraction control device of claim 1, the sequential regulator configured to direct duty factor adjustments in response to signals from a guiding device.

6. The sequential energy extraction control device of claim 1, a gap between the first duty cycle and the second duty cycle being no more than one third of the PWM cycle.

7. The sequential energy extraction control device of claim 1, a gap between the first duty cycle and the second duty cycle being no more than one fifth of the PWM cycle.

8. The sequential energy extraction control device of claim 1, a gap between the first duty cycle and the second duty cycle being no more than one twentieth of the PWM cycle.

9. The sequential energy extraction control device of claim 1, a gap between the first duty cycle and the second duty cycle being no more than one hundredth of a PWM cycle.

10. A sequential extraction control device for use in a 3-phase DC/AC converter that comprises a first single-phase DC/AC converter comprising a first PWM extractor to extract from DC power first AC power that has a first phase and that conforms to a power grid convention, a second single-phase DC/AC converter comprising a second PWM extractor to extract from the DC power second AC power that has a second phase and that conforms to the power grid convention, and a third single-phase DC/AC converter comprising a third PWM extractor to extract from the DC power third AC power that has a third phase and that conforms to the power grid convention, the sequential extraction control device comprising:

a sequential regulator that causes the first PWM extractor to have a first duty cycle during which the first PWM extractor performs extraction, causes the second PWM extractor to have a second duty cycle during which the second PWM extractor performs extraction, and causes the third PWM extractor to have a third duty cycle during which the third PWM extractor performs extraction; and such that the first, second and third duty cycles do not overlap, such that the first, second and third PWM extractors perform extraction sequentially, the sequential regulator configured to direct duty factor adjustments for the first, second, and third duty cycles depending on a current portion of an AC power cycle of at least one of the first AC power, the second AC power and the third AC power, the duty factor adjustments being such that the first duty cycle is $2/3 \cos^2(\omega t)$, the second duty cycle is $2/3 \cos^2(\omega t+120°)$, and the third duty cycle is $2/3 \cos^2(\omega t-120°)$ as function of time t in the AC power cycle.

11. A 3-phase DC/AC converter system comprising:
a 3-phase DC/AC converter that comprises: a first single-phase DC/AC converter comprising a first PWM extractor to extract from DC power first AC power that has a first phase and that conforms to a power grid convention, a second single-phase DC/AC converter comprising a second PWM extractor to extract from the DC power second AC power that has a second phase and that conforms to the power grid convention, and a third single-phase DC/AC converter comprising a third PWM extractor to extract from the DC power third AC power that has a third phase and that conforms to the power grid convention; and a sequential regulator that causes the first PWM extractor to have a first duty cycle during which the first PWM extractor performs extraction, causes the second PWM extractor to have a second duty cycle during which the second PWM extractor performs extraction, and causes the third PWM extractor to have a third duty cycle during which the third PWM extractor performs extraction; and such that the first, second and third duty cycles do not overlap, such that the first, second and third PWM extractors perform extraction sequentially, the sequential regulator configured to direct duty factor adjustments for the first, second, and third duty cycles depending on a current portion of an AC power cycle of at least one of the first AC power, the second AC power and the third AC power, the sequential regulator comprising:

a time clock;

a time table with a plurality of columns, each column corresponding to a respective portion of an AC power cycle, and representing sufficient information to determine the first, second, and third duty cycles for the respective portion of the AC power cycle; and an activator configured to use the sufficient information to sequentially activate the first, second, and third PWM extractors.

12. The 3-phase DC/AC converter system of claim 11, the sufficient information being a start time and an end time for the first duty cycle.

13. The 3-phase DC/AC converter system of claim 11, the time table containing at least two value in each of the plurality of columns; the first value being equal to $D*(2/3)*\cos^2(\omega t)$ and the second value is equal to $D*(2/3)*\cos^2(\omega t+120°)$, where D is the PWM period and t is the time within the AC power cycle.

* * * * *